US009185639B1

(12) United States Patent
Sherman et al.

(10) Patent No.: US 9,185,639 B1
(45) Date of Patent: Nov. 10, 2015

(54) DISCOVERY AND ACQUISITION METHODS FOR DIRECTIONAL NETWORKING

(71) Applicant: BAE Systems Information and Electronic Systems Integration Inc., Nashua, NH (US)

(72) Inventors: Matthew J. Sherman, Succasunna, NJ (US); David A. Haessig, Jr., Towaco, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 259 days.

(21) Appl. No.: 13/803,242

(22) Filed: Mar. 14, 2013

Related U.S. Application Data

(60) Provisional application No. 61/615,652, filed on Mar. 26, 2012.

(51) Int. Cl.
*H04W 48/16* (2009.01)
*H04W 84/18* (2009.01)
*H04W 40/24* (2009.01)

(52) U.S. Cl.
CPC .............. *H04W 48/16* (2013.01); *H04W 84/18* (2013.01); *H04W 40/24* (2013.01)

(58) Field of Classification Search
None
See application file for complete search history.

(56) References Cited

U.S. PATENT DOCUMENTS

| | | | | |
|---|---|---|---|---|
| 8,816,933 B2* | 8/2014 | Scott et al. | ..................... | 343/879 |
| 2007/0253341 A1* | 11/2007 | Atkinson et al. | .............. | 370/252 |
| 2008/0146248 A1* | 6/2008 | Himmelstein | .............. | 455/456.1 |
| 2010/0045512 A1* | 2/2010 | Nelson | ......................... | 342/25 A |
| 2010/0189089 A1* | 7/2010 | Lynch et al. | .................... | 370/338 |
| 2010/0224732 A1* | 9/2010 | Olson et al. | ................... | 244/190 |
| 2010/0269143 A1* | 10/2010 | Rabowsky | ..................... | 725/63 |
| 2012/0235863 A1* | 9/2012 | Erdos et al. | ................... | 342/359 |
| 2012/0295537 A1* | 11/2012 | Zaruba et al. | ................. | 455/12.1 |
| 2013/0017796 A1* | 1/2013 | Milner et al. | .............. | 455/67.13 |

* cited by examiner

*Primary Examiner* — Derrick Ferris
*Assistant Examiner* — Manuel Rangel
(74) *Attorney, Agent, or Firm* — Sand & Sebolt; Daniel J. Long

(57) ABSTRACT

A system and method of assisting a radio in finding a network is presented. A method first detects existing nodes. A message is received on a slow communication link in a slow network from a new node. One or more existing nodes are found that may connect to new node with a fast communication link in a fast network. The fast network has a data rate that is faster than the slow network. A message is transmitted over the slow network to the new node to provide the new node possible existing nodes that are near it that it may connect to. Based on that message the new node establishes a fast communications link on the fast network between the new node and an existing node. The fast communications link can be a directional link.

22 Claims, 16 Drawing Sheets

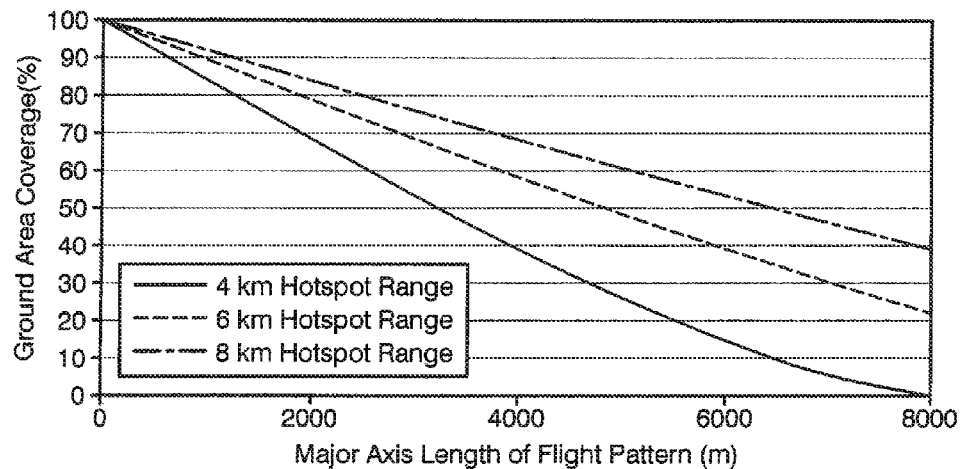
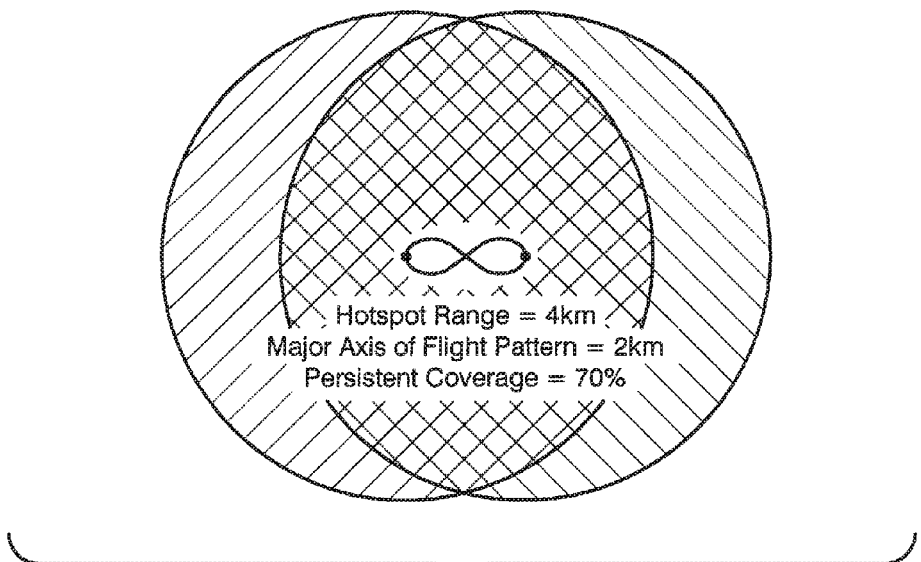
FIG-6

| Error Source | Error (deg) | |
|---|---|---|
| | Open-loop Pointing | Closed-loop Tracking |
| Positioner Static Error | 0.20 | 0.00 |
| Positioner Servo Dynamic Error (at low temperature) | 0.25 | 0.25 |
| Heading Drift Error (3 sigma) | 0.45 | 0.00 |
| GPS/INS Data Latency Error (60 deg/sec, 1 msec) | 0.06 | 0.06 |
| Pedestal to INS coordinate frame misalignment | 0.10 | 0.00 |
| Target Location Uncertainty | 0.20 | 0.00 |
| TOTAL POINTING ERROR (Sum of Component Parts) | 1.26 | 0.31 |

FIG-11

| Network Parameters | |
|---|---|
| $c(m,n,t)$ | Cost of link between nodes m, n. N=number of nodes |
| $C(m,t)$ | Penalty of not connecting node m to GIG |
| $q(m,i,n,j,t)=0$ | Non-connectability (angle, distance, polarity) btw radios i,j |
| Decision Variables | |
| $y(m,i,n,j,t)=1$ | Radio i on node m connected with radio j on node n; 0 otherwise |
| $h(m,n,t)$ | Capacity of link between m and n |
| $x(m,n,t)$ | Flow between m and n |
| $b(m,t)=1$ | If node m has path with GIG, otherwise 0 |
| Integer Programming Optimization | |
| $\min\{\sum_{n,m} c(m,n,t)x(m,n,t) + \sum_m C(m,t)(1-b(m,t))\}$ | Min total path cost |
| Constraints | |
| $\sum_{n,j} y(m,i,n,j,t) \leq 1$ | Radio i can only be connected with one other radio |
| $h(m,n,t) \leq (N-1)\sum_{i,j} y(m,i,n,j,t)$ | Capacity=0 if m, n not connected |
| $\sum_n x(m,n,t) - \sum_n x(n,m,t)=b(m)$ | Node m connected to GIG if bal of flow=1 |
| $\sum_n x(n,0,t) - \sum_n x(0,n,t)=\sum_{m\neq 0} b(m)$ | Flow balance in GIG node (0) |
| $x(m,n,t) \leq h(m,n,t)$ | Flow limited by link capacity |
| $y(m,i,n,j,t) \leq q(m,i,n,j,t)$ | Radio connectivity limited by physical constraints |

FIG-14

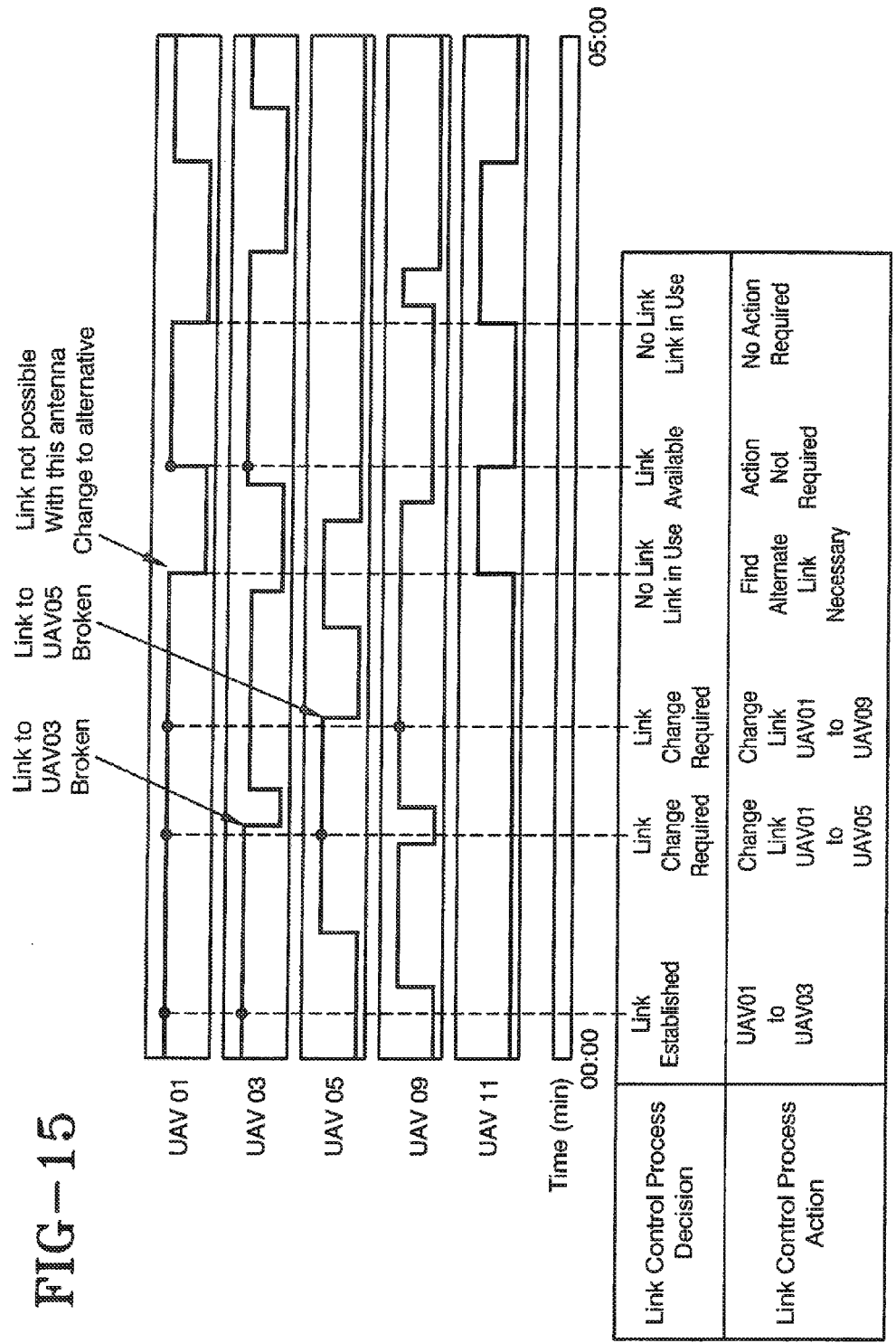

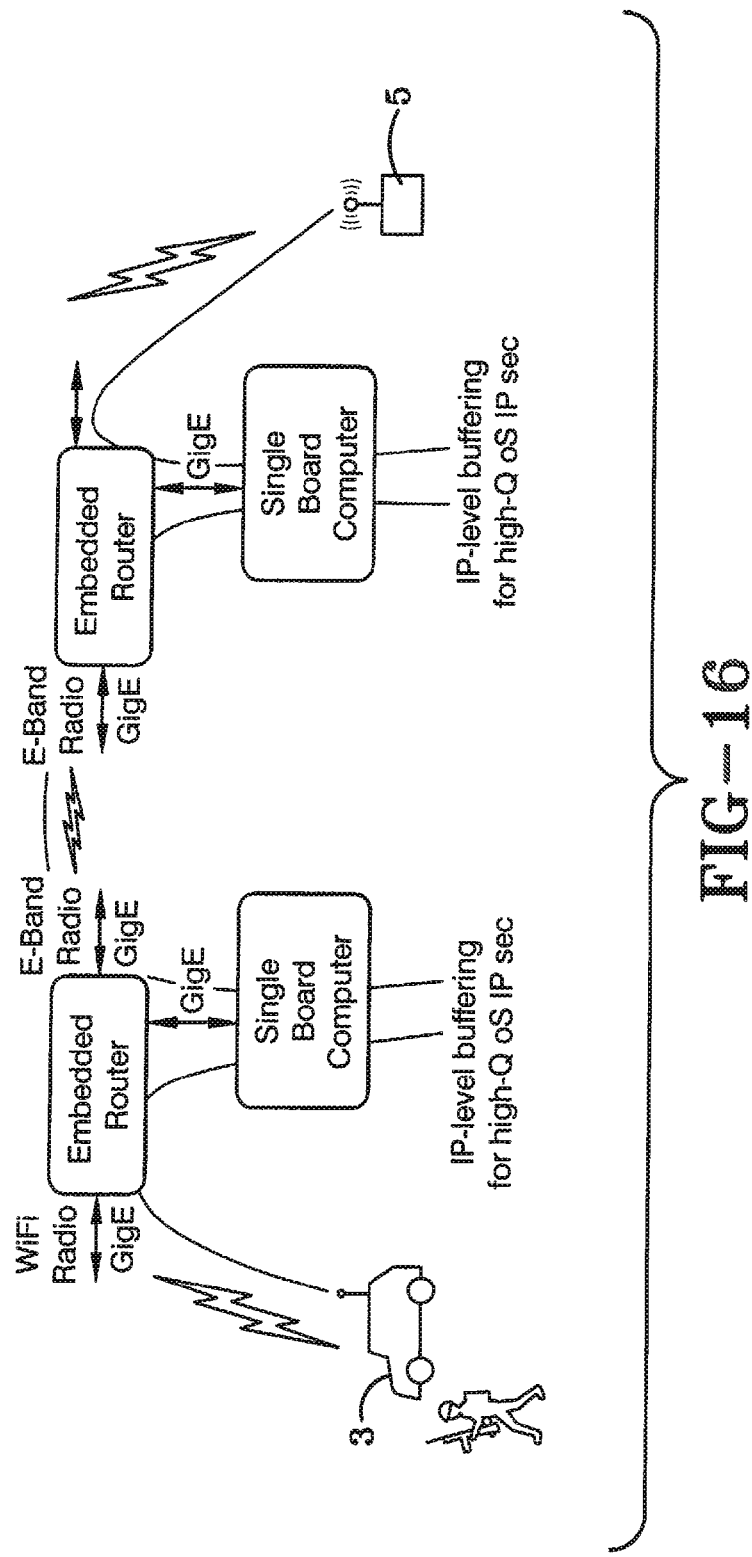

DISCOVERY AND ACQUISITION METHODS FOR DIRECTIONAL NETWORKING

CROSS REFERENCE TO RELATED APPLICATION

This application claims priority from U.S. Provisional Application Ser. No. 61/615,652, filed Mar. 26, 2012; the disclosure of which is incorporated herein by reference.

BACKGROUND OF THE INVENTION

1. Field of Invention

The current invention relates generally to apparatus, systems and methods for computer networking. More particularly, the apparatus, systems and methods relate to connecting a mobile device to a computer network. Specifically, the apparatus, systems and methods provide for assisting a mobile device to quickly find a node to communicate within a network.

2. Description of Related Art

Many discovery techniques exist to find a node within a radio network. A common approach is to use an omni radio link. However to cover the maximum range (distance) with bursty discovery packets it is necessary to allocate substantial size weight and power (SWAP). A radio considered for such a purpose is Link 16. By contrast an Iridium SBD radio consumes a fraction of the SWAP of a discovery radio such as Link 16. An alternate set of discovery techniques utilize the directional links themselves for discovery. But for narrow beam systems, a very large number of tiles must be searched repeatedly on a regular basis, even if no one is there to link with. This results in substantial resources being wasted on the directional link. A need, therefore, exists for improved discovery and acquisition methods for use in directional networking.

SUMMARY

The preferred embodiment of the invention includes a method of assisting a radio in finding a network. The method first detects existing nodes. A message is received on a slow communication link in a slow network from a new node. One or more existing nodes are found that may connect to new node with a fast communication link in a fast network. The fast network has a data rate that is faster than the slow network. A message is transmitted over the slow network to the new node to provide the new node with information about the possible existing nodes that are near it and that it may connect to. Based on that message, the new node establishes a fast communications link on the fast network between the new node and an existing node. In the preferred embodiment, the fast communications link is a directional link and generally all connections made to the fast network are ideally made with directional links.

In one configuration of the preferred embodiment, the fast network is a wireless network operating in the E-Band between 2 GHz and 3 GHz and the slow network is a wireless network operating in a frequency band between 1618.85 MHz and 1626.5 MHz.

Another configuration of the preferred embodiment is a method for adding a new node to a fast network using directional links. The method begins by communicating with a new node over a slow network without using a directional link. The data rate of the slow network is less than the data rate of the fast network. A message is sent to the new node over the slow network indicating at least one exiting node on the fast network that is near the new node. A directional antenna associated with the new node is pointed toward a node near the new node. A fast communications link is then established on the fast network between the new node and the node near it.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6 illustrates the hotspot coverage area for an UAV in flight (relative to hover).

FIG. 11 is a table of pointing error budgets for both open loop tracking and closed loop tracking.

FIG. 14 illustrates some variables, parameters, constraints and other data useful when maintaining hotspot backbone networks.

FIG. 15 illustrates a timing diagram used to manage links with various radios in different UAVs or other vehicles.

FIG. 16 illustrates an example third reliability layer provided by an IP-layer gateway implemented in software running on the single board computer (SBC) of each node.

Similar numbers refer to similar parts throughout the drawings.

DETAILED DESCRIPTION

Figure 1:
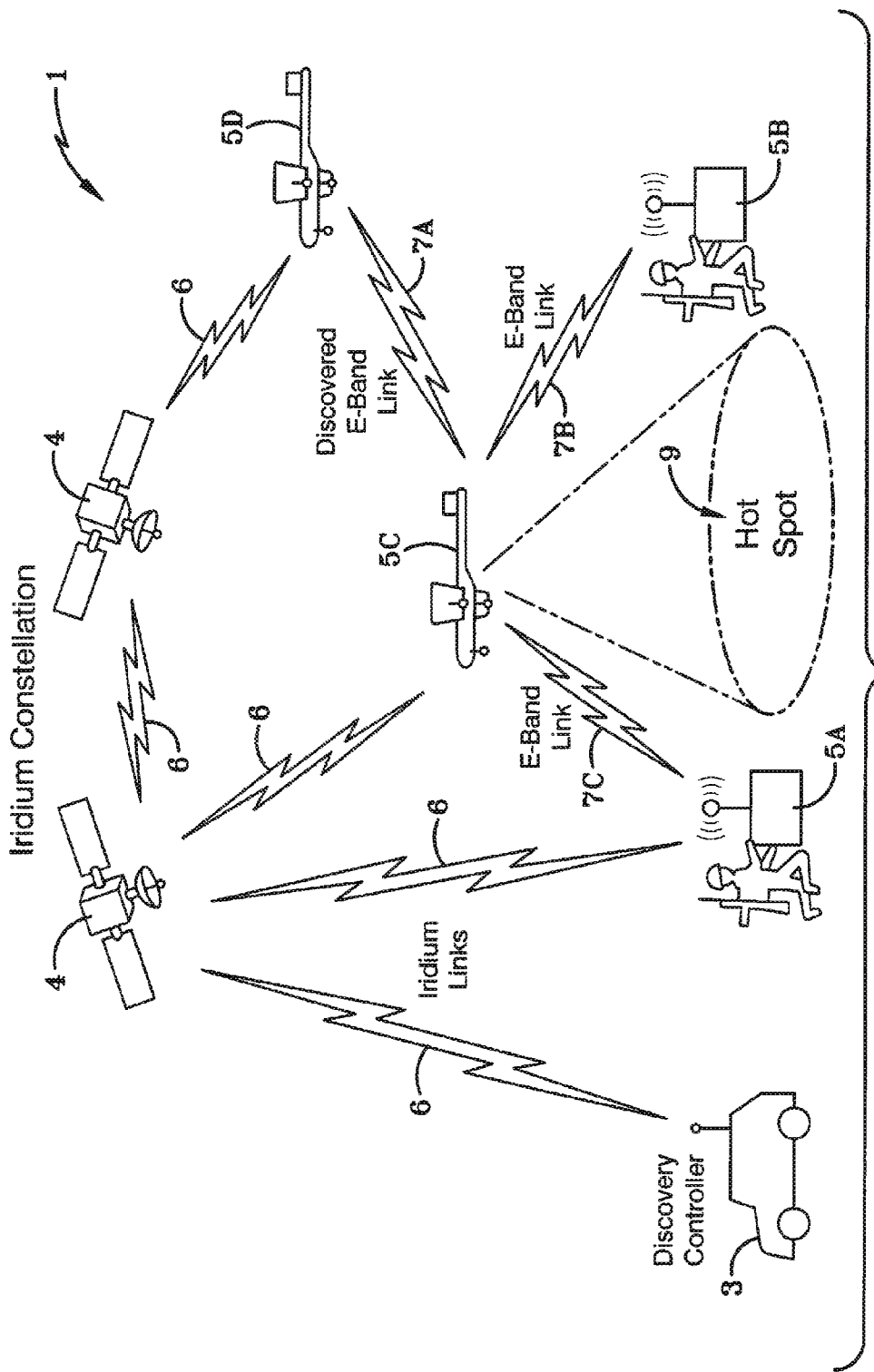
FIG. 1 illustrates a preferred embodiment of a system for connecting a radio with a directional radio to a fast network.

FIG. 1 illustrates the preferred embodiment of a system 1 for managing nodes entering a network. The system 1 includes a global network controller (NC) 3 that is used to register the location and status of nodes capable of directional networking links. As indicated in FIG. 1, the NC 3 also acts as a discovery controller/server. At one point in time, the system 1 may include three nodes 5A-C already connected to the network. Later, a disconnected node 5D may enter the network and desire to connect to the network. It may be aware of the NC 3 and send slow messages to it over slow links 6. For example, it could send slow messages to the NC through a slow satellite link such as through the Iridium constellation of satellites 4. When the disconnected node 5D becomes sufficiently close to form a link, the NC 3 starts passing the location of the new neighbor node 5D to each of the nodes 5B, 5C it believes can now form a new directional link 7A. It might also give navigational guidance to the new node 5D to help it connect. The NC 3 continues to provide location information until the status of the network indicates that the desired new link 7A has been formed.

Once the nodes 5C, 5D have formed a directional link 7A that is part of a fast network, they broadcast their location to every node 5A-D on their network fragment connected by directional links 7A-C. Typically this can be done at a much higher rate than on the SATCOM links 6 permitting all nodes 5A-D to be aware of all other nodes 5A-D on the same network fragment. The nodes then autonomously decide what links to make and break based on the information passed on the directional links rather than SATCOM.

A suitable SATCOM infrastructure is the Iridium Short Burst Data (SBD) service but other systems can be used. Other Iridium services (such as Netted Iridium or Circuit Switched Data) can also be used or other SATCOM systems such as OrbComm or MUOS.

The Iridium SBD links have high latency. To accommodate the latency, the acquisition system must be tolerant of substantial initial miss-pointing due to many sources of error, including relative motion of the nodes between position updates. These motions may be partially compensated with suitable prediction algorithms as well. The maximum error in the system 1 can be determined, and a suitable search beamwidth and search pattern can be established. The search beamwidth might be variable based on the distance between the nodes with a wider search beam being used when nodes are close together due to the reduced path loss allowing operation further down the directional beam sidelobes.

To reduce synchronization concerns, dwell times in the search pattern can be set to double the modem acquisition time ensuring that even if the antennas are switching between search tiles in the pattern asynchronously links can be acquired. The terminals would then use a "Stare and Scan" search technique where the NC 1 requests one node to "stare" at one tile in the pattern for N dwell times where N is the number of tiles in the search pattern. The other node is told by the NC to scan all tiles in the pattern consecutively using one dwell time each. The Staring node would then increment to the next tile in the search pattern and hold for another N dwells and so on. If on platform pointing errors can be sufficiently reduced and both nodes have a suitable time reference (such as GPS) synchronous scan techniques can be applied where both nodes increment every dwell time through complementary search patterns and the dwell time need only account for a single modem acquisition time.

The preferred embodiment also implements a Hot Spot Discovery (HSD) network 9. This can be implemented using Iridium's Short Burst Data (SBD) service or another service. While Iridium is proposed, other systems such as Orbcomm or MUOS could also be used. The Iridium based approach allows the discovery radio to be reduced to a mere 30 grams and <1 Watt average power! It allows not just for 100 Km line of site (LOS) discovery, but true global discovery and management of the network.

The primary role of discovery is to help disconnected nodes connect to the hot spot backbone (HSB) network, and HSB fragments to connect/reconnect. To do this, the system includes the NC 3 which implements a discovery service. All nodes periodically send SBD to the NC 3 which tracks the location and status of everyone. Nodes that have not yet entered the HSB, or have become disconnected due to mobility leverage the NC 3 to become connected. When the NC detects that disconnected nodes/fragments are within range of each other, it will inform them of each others positions and request specific nodes to form links using SBD. The NC 3 will repeatedly pass position data to nodes that need to link until their SBD status reports indicate a successful link. Round trip latencies of 10 seconds are expected for Iridium SBD. The process to form a link (once both nodes are informed) takes <5 seconds. So network discovery will take <15 seconds. This is enabled by the ability to predict node positions sufficiently in the future with the connectivity predictor and accommodate substantial miss-pointing with the PNT approach. Because of the low data rates, this approach can scale to >20 nodes.

Once on the HSB, nodes regularly broadcast their positions to all other nodes on the network. Route and topology management proactively determine when new links are formed/torn down. Link instantiation takes <5 seconds for nodes connected to each other via the HSB and does not involve the NC or Iridium SBD. Link instantiation/termination can be timed so as not to impact network QoS.

Figure 2:
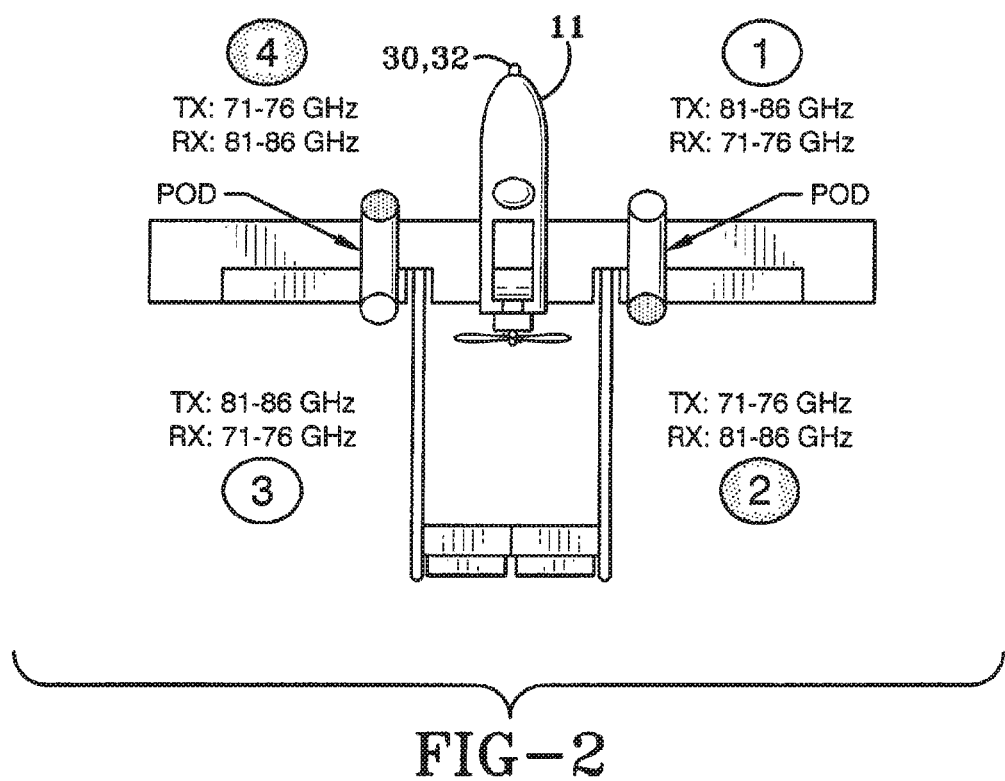
FIG. 2 illustrates an example frequency division duplex (FDD) configuration on a notional UAV with multiple genders (full duplex).

Having described the major features of the preferred embodiment, other details will now be described. FIG. 2 illustrates a frequency division duplex (FDD) configuration on a notional UAV 11 with multiple genders (full duplex). Ideally a proposed distribution of radio genders provides 360 degree azimuthal coverage for communication with target radios of either gender below the horizon (i.e., ground-based radios).

Figure 3:
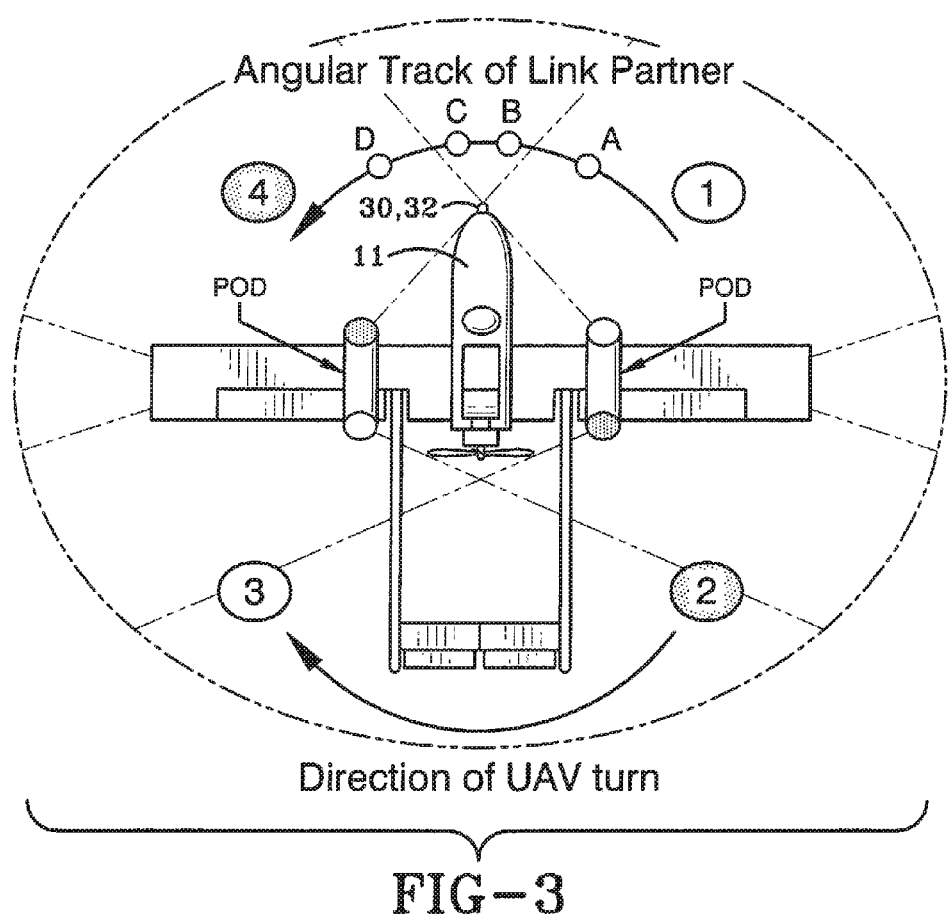
FIG. 3 depicts a predictive routing (PR) handoff scenario as the UAV 11 makes a turn.

For an air target, the field of regard is hindered by the line of site (LOS) obstructions of the airframe (FIG. 3). Even with these obstructions, four azimuthal regions supporting various handoff combinations for an air-to-air link are possible. The FDD configuration guarantees that all handoffs will be cross-polarity. Cross-polarized simultaneous links can be supported by the preferred embodiment by both air and ground nodes. Links will be configured for different channels to prevent co-channel interference. FIG. 3 depicts a Predictive Routing (PR) handoff scenario as the UAV 11 makes a turn. Say a neighbor UAV (link partner) occupies angular positions A, B, C, and D as illustrated in FIG. 3. At position A, PR maintains a link via transceiver 1. At B, PR still relies on transceiver 1's link. PR now identifies that link partner will soon track out of transceiver 1's field of regard. A router then steers transceiver 4 into position and requests/acquires a second redundant link (assuming a spare transceiver at the peer UAV 11 is available). At C, PR fully acquires a redundant link; next drops transceiver 1's link and serves transceiver 4's link. At D, the PR relies on transceiver 4.

Figure 4:
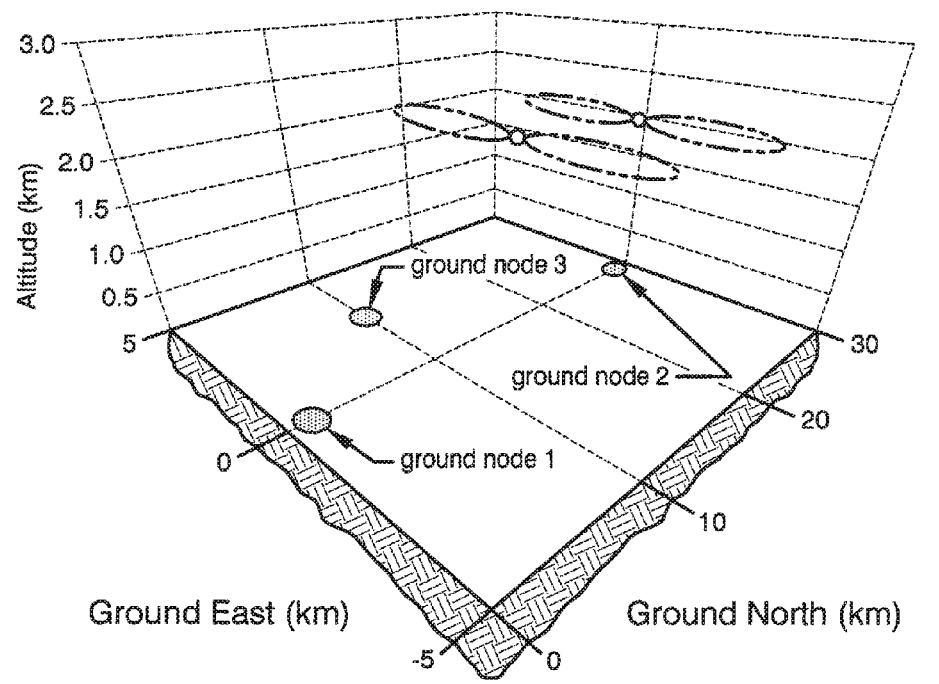
FIG. 4 illustrates an example of modeling of the PR strategy that was simulated.

Modeling of the PR strategy was performed as illustrated in FIG. 4. The modeling assumed a phase 3 reference demo; that is, 3 ground nodes and 2 UAVs flying in a figure-8 ("lemniscate of Bernouilli"). Time for steering the transceiver antenna and FDD reconfiguration were accounted for in the model (based on SNR link budget with allowable mmw pointing error). Initial Position/heading info was assumed to be available with high accuracy. Average UAV speed was 150 km/hr (typical of RQ-7 Shadow). Ground-Air and Air-Air links were carefully evaluated under various motion configurations (East-West, North-South). A reactive routing scheme, where router acquires a new link upon outage, was modeled for comparison purpose. Clearly reactive routing and PR outperform a conventional approach in all motion cases as illustrated in FIG. 4. The PR performs best as reactive routing is late-reactable to the UAV motion. By the time, the router steers its transceiver to a new position (or switches to a new transceiver), the link partner is already in the deaf state. PR can request a new link in advance and forwards traffic there. In general, UAV motion configuration plays a major role in end-end coverage. For example, a serial arrangement (South-North) with fixed ground nodes can result in fewer disruptions than a parallel arrangement at the expense of larger downtime. Diversity of traffic flows and available UAV link interfaces are also important consideration in a prediction strategy.

Hotspot Radio Ground Coverage

Figure 5:
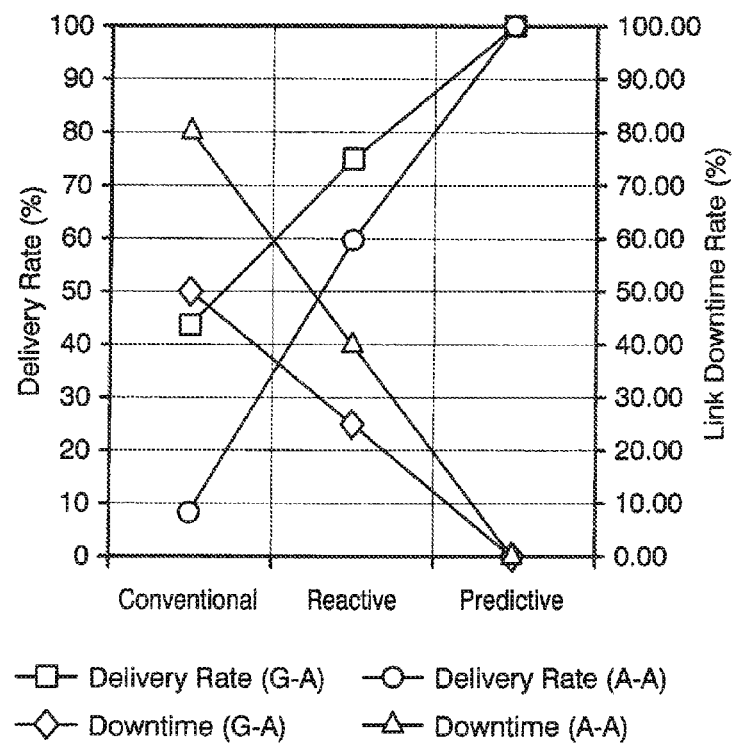
FIG. 5 illustrates the results of the PR that was simulated according to FIG. 4.

Relative to fixed infrastructure, a hotspot radio mounted to a mobile airborne base station is challenged to deliver persistent service to static ground areas. Consider a Shadow UAV at a 1.5 km altitude; projecting the hotspot radio signal 4 km away requires a beamwidth >140° in both E/H planes. Allowing for banked turns of up to 20° in either direction dictates a hemispherical antenna pattern (180°, 3 dBi). With a downward looking fixed hotspot antenna, persistent ground coverage pattern is determined by the hotspot radio range and the flight pattern. For typical flight patterns with a relatively long major axis (e.g. figure-8, racetracks), persistent coverage area is well-approximated as the intersection of two circles (radius=hotspot range) centered at the extremes of the flight pattern. If the flight pattern's turn radius is too small, the increased bank angle will distort the ground spot and disrupt the mmW links. As shown in FIGS. 5 and 6, a 2-km-long flight pattern minimizes these affects while delivering coverage of 70% times maximum. Note that for a fixed flight pattern, coverage percentage increases with hotspot range.

Figure 7:
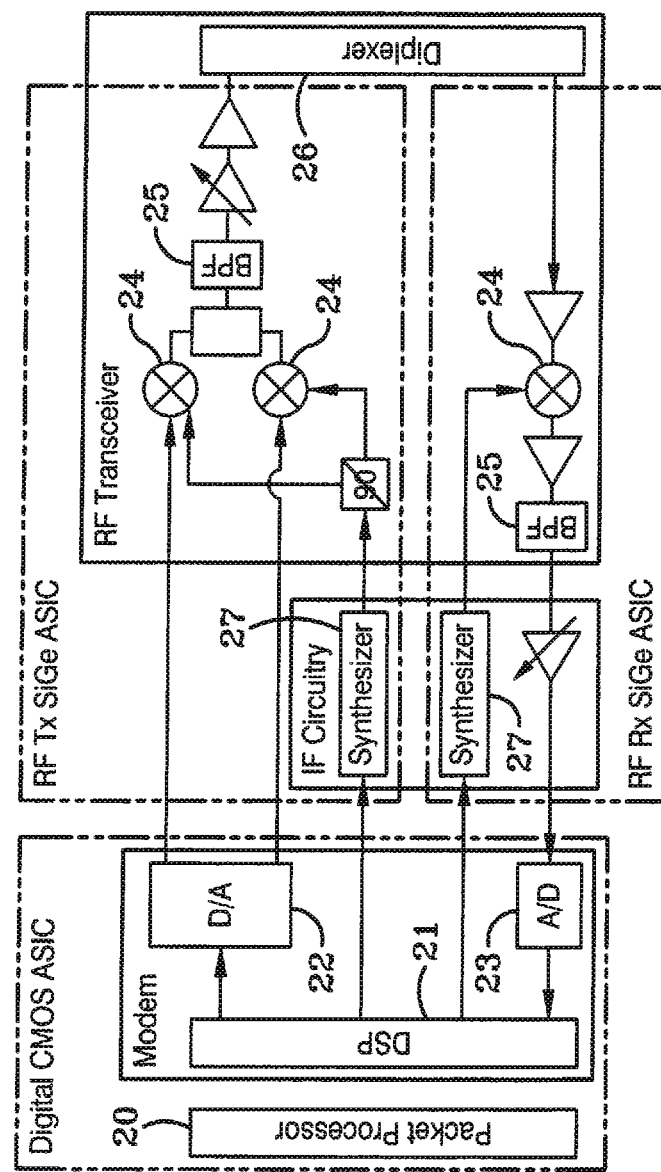
FIG. 7 illustrates one example of how an E-Link Mini can be implemented as full SiGe and as an ASIC based transceiver.

E-Band mmW Transceiver/Modem:

The preferred embodiment in some configurations can leverage the E-Band Communications (EBCC) E-Link Mini platform. The E-Link Mini operates from in the ranges of 71-76 GHz/81-86 GHz and supports full duplex data rates from 41 Mbps to 1000 Mbps. Using this type of system or a similar system provides for leveraging the commercial development of this transceiver/modem. The E-Link Mini can be implemented as full SiGe and as an ASIC based transceiver as depicted in FIG. 7. This radio includes a digital ASIC that includes a packet processor 20 and a modem with a DSP 21 a D/A converter and an A/D 22 converter 23. It further includes an RF side SiGe ASIC that includes mixers/multipliers 24 band pass filters BPFs 25, and an IF circuitry with synthesizers 27. It can further include other buffers, filter and other devices. This on-going commercial development may eventually lead to an 8 W DC power transceiver including modem and network processor. The E-Link Mini meets or exceeds TA#1 performance metrics. Its receiver sensitivity metrics are exceeded (by 7-10 dB) at 41 Mb/s for the 10 Mb/s case, so there is no need to throttle the modem back further than the 41 Mb/s rate.

E-Band Antenna

Three major system sub-components (transceiver front-end, antenna, and antenna positioner) will occupy a confined space. Although multiple approaches are available one approach is to develop an axisymmetric antenna design using a parabolic main reflector and Cassegrain feed system comprised of a multi-mode feed horn and a hyperbolic sub-reflector. For this configuration the RF input to the feed horn would be located behind the vertex of the main reflector, where it would be directly coupled to the transceiver analog front end module. Swept volume constraints of the proposed antenna positioner allow the use of 7" Cassegrain antenna; conservative performance projections for an antenna of this configuration are 39.3 dBic at 71 GHz (low-band), 40.2 dBic at 78.5 GHz (midband), and 40.9 dBic at 86 GHz (high-band).

To meet the needs of an airborne steerable point-to-point link, a circularly-polarized antenna can be used. Typical circularly polarized antenna systems require the use of a waveguide polarizer or hybrid, either of which take up space and add weight and cost. As an alternative, mWAVE can use a method of construction on the reflector surface that transforms a linearly polarized feed transmission into a circularly polarized antenna transmission. The space, weight, and cost increases over a standard reflector surface should be minimal, resulting in an overall SWAP reduction by forgoing the waveguide polarizer or hybrid.

Antenna Positioner

The tracking antenna sub-assembly ideally would provide (1) the overall field-of-regard (FOR) defined earlier, (2) tracking of the opposing node with an accuracy not exceeding a 1 dB pointing loss over temperature and everywhere within the FOR, and (3) angular velocity and acceleration sufficient for acquisition, for re-pointing anywhere within the FOR in less than 0.5 seconds, and for stabilizing against the riling motion of a small UAV. Its selecting should include consideration of various gimbal structures including 2- and 3-axis arrangements, symmetric and offset antenna beams, direct and geared gimbal drives, cable wraps vs. slipring-rotary joints, open-loop pointing versus closed-loop tracking, and inertial sensor placement on the antenna or attached to the pod base.

Figure 8:
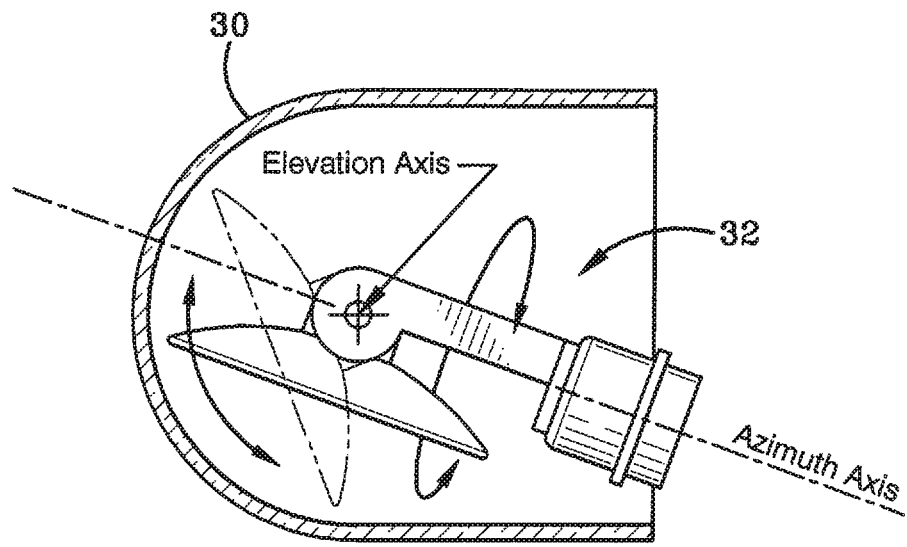
FIG. 8 an example nose of an UAV with an antenna mounted inside it.

One approach that is optimal is illustrated in FIG. 8 that shows the nose of an UAV with an antenna 32 mounted inside it. It is a relatively simple approach that meets the FOR, does not place the zenith singularity within the FOR, achieves the weight and power goals, and supports a 7" diameter, 41 dB antenna. It is an El/Az design using direct drive motors and resolvers, yoke-arms permitting a 30° downlook relative to the azimuth axis, and cable wraps. Motor drive electronics (not shown) are 3.5"×3.5"×0.8" in size and mount above the Az gimbal base. It is included in the weight and powers given below.

Note the 20° uptilted azimuth axis. This places the zenith singularity, which is along the azimuth gimbal axis, outside and above the FOR. When the line-of-sight (LOS) is near the singularity the required azimuth gimbal rates and accelerations grow with $\sin^{-1}(\theta)$, where $\theta$ is the angle between the two. A turn rate, for example, of 10°/sec plus a 3°, 2 Hz sinusoidal buffeting of ~40°/sec produces a demanded azimuth gimbal rate of 40/sin(10)=290°/sec. The motors must provide that speed and sufficient torque. The motor in both gimbals (Applimotion UTH-56) has a Kt=14 in-oz/A, can drive a 19 in-oz at 7200°/sec. Peak power when driving this load is 19 W, and average is 8 W. Further, with a 20° uplook the LOS never can circle around the singularity. This limits azimuth gimbal rotation to about ±90°, permitting a cable wrap. Also, the 30° downlook results in a 10° backlook relative to the vehicle as required. When bringing the LOS up to horizontal, the FOR extremes are nearly ±120°, exceeding the requirement of ±110°. Servo tracking accuracy of 0.25° during 3°, 2 Hz inputs is achieved with a 15 Hz servo bandwidth.

The RF subsystem mounted behind the antenna serves to counter balance the assembly, placing the CG at the intersection of the axes to within 0.05", thereby limiting acceleration induced torques, angular disturbances and tracking error.

Figure 9:
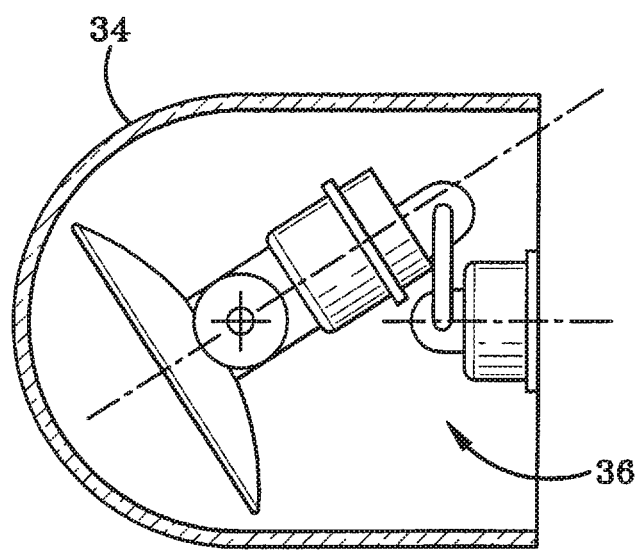
FIG. 9 an example nose of an UAV with an antenna configured in a gimbal arrangement mounted inside it.

A three axis gimbal arrangement was considered and is illustrated in FIG. 9 that shows the nose of an UAV and its antenna. A $3^{rd}$ axis allows continual adjustment to keep the singularity away from the LOS. However, it may not be optimal in this application; common LOS trajectories will require unwrapping events. Also, weight, power, and size increase.

Pointing, Acquisition, and Tracking (PAT)

Figure 10:
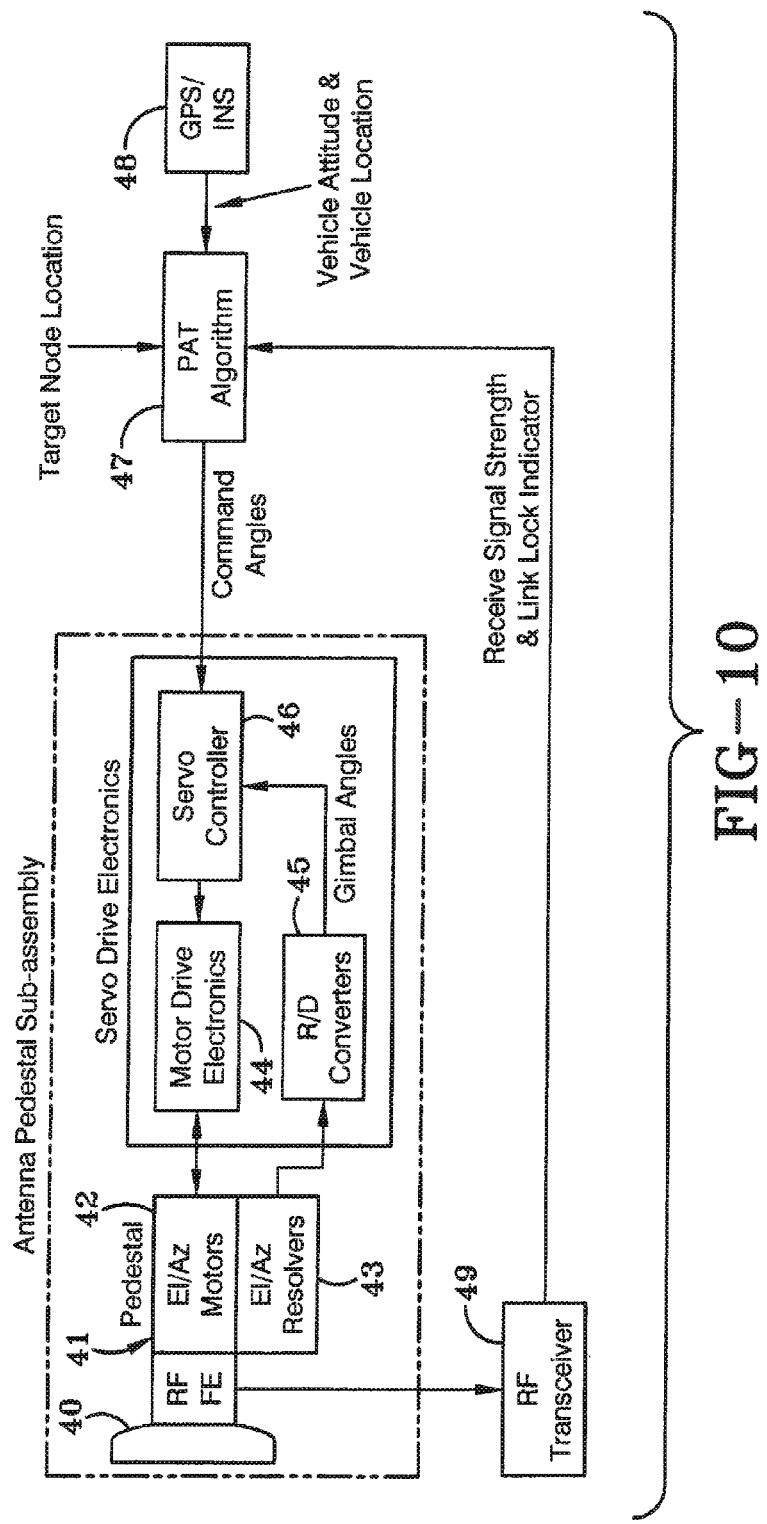
FIG. 10 illustrates an example block diagram of a pointing, tracking and acquisition (PAT) system.

The locations of the target node and vehicle, and vehicle attitude define the azimuth and elevation command angles relative to the vehicle. The PAT system of FIG. 10 includes an antenna 40, pedestal 41 that includes motors 42 and resolvers 43, motor electronics 44, R/D converters 45, a servo controller 46 a PAT algorithm logic 47, a GPS/INS unit 48 and an RF transceiver 49. The pedestal servo 41 receives and tracks those commands, thereby pointing the LOS at the Target Node and stabilizing the LOS against UAV attitudinal disturbances. Acquisition and tracking refer to the detection and removal of bias errors during acquisition before a link is formed, and while the link is up, respectively. The RF received signal strength metric enables closed-loop tracking.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

The pointing error budget consists of static and dynamic error. Static (pedestal, boresight cal., radome distortion) is approximately 0.2° peak. FIG. 11 is a table showing dynamic error for open-loop and closed-loop operation. Open-loop means no RF feedback. Target Node location is provided to the PAT algorithm logic, which points the antenna 40 accordingly, stabilizing the LOS about that pointing vector. Acquisition mode then begins, starting with a peak error estimated to be 1.26°.

To acquire one node stares and the other searches, the staring node lingering twice as long as the other requires to scan the region of uncertainty. In this case, with a 1.26° error radius relative to the 0.4° beam radius (1 dB), a scan takes an estimated 1 second. The staring node updates its pointing direction every 2 seconds and the overall Acquisition period takes 16 seconds. When the link is discovered, the sync event occurs and a Link Lock Indicator sent. PAT transitions to Track Mode given the current offset location at the end of acquisition as a starting point. A conical scan producing about a 0.2 dB of signal strength variation is used to peak up the beam, removing slowly varying errors as noted in the right column of FIG. 11. Preferably, opposing nodes perform a conical scan periodically, not continuously, and at different times. During track mode, peak errors should be limited to ~0.3° peak error.

Millimeter-Wave LNA:

Improvement in PA power and efficiency are desired. A 3 dB improvement in link margin with no penalty in DC power consumption is readily achievable through LNA enhancement, exploiting recent advances in low noise device technology. A sub-2 dB noise figure MMIC low noise amplifier (LNA) can be designed operating at E-band using a 50 nm low noise MHEMT process. Current COTS GaAs PHEMT LNAs exhibit 5 dB noise figure with only 13-14 dB gain at E-band, while more costly 0.1 μm InP HEMT LNAs (HRL LM4-110) cover the 81-86 GHz band with 4 dB maximum NF.

Currently, 50 nm MHEMTs have been used to demonstrate a hybrid 2-stage LNA with 1.6 dB NF and 22 dB gain at 59 GHz measured at the input waveguide flange, a state-of-the-art result. The process has also been used in the past to design MMIC LNAs at Ka, V, W and G-band. Designs targeted at achieving lowest possible NF in the desired bands with 20 dB minimum gain. These designs as well as additional E-band LNA designs from Quinstar and Princeton Microwave can be fabricated a 50 nm MHEMT process, RF tested on-wafer, and MMICs.

One configuration of the preferred embodiment includes a self-sustaining HotSpots Backbone (HSB) network composed of UAV-based and ground-based (ISR, FOB) network nodes whose mmW radio links are autonomously coordinated to minimize network disconnects.

Figure 12:
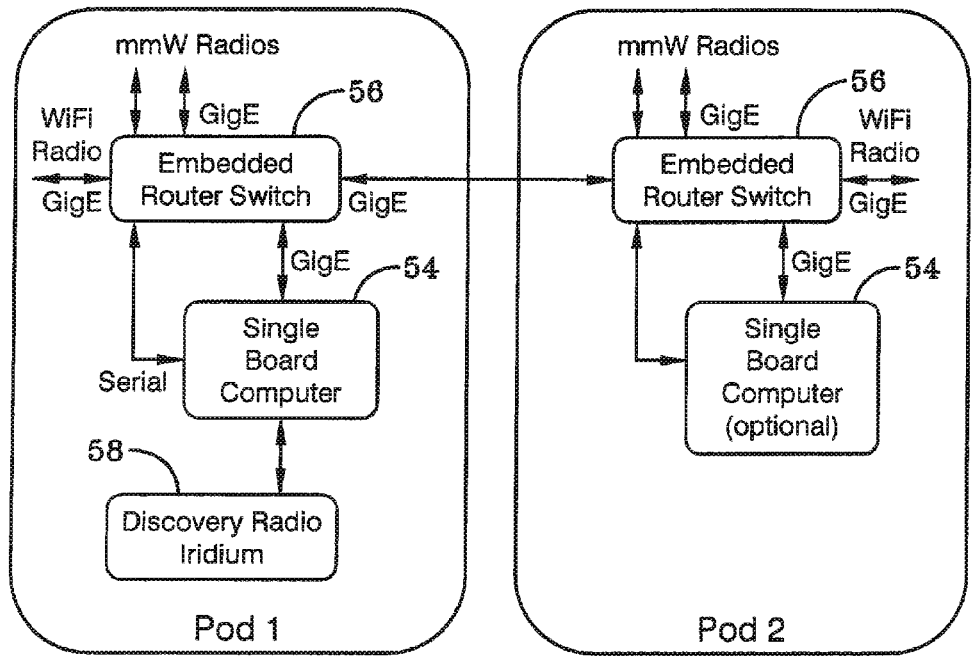
FIG. 12 illustrates can example of a two pod version of a HotSpots Backbone (HSB) network.

Each HSB node (FIG. 12 showing the two-pod version) is composed of a COTS HW switch/router that provides GbE rate forwarding between mmW and WiFi radios. The switch and WiFi radios are controlled by software running on a Single-Board Computer (SBC) 54. A single-pod HSB node is composed only of Pod 1. Pods 1 and 2 each contain an embedded router switch 56 and pod 1 includes a discovery radio 58.

Figure 13:
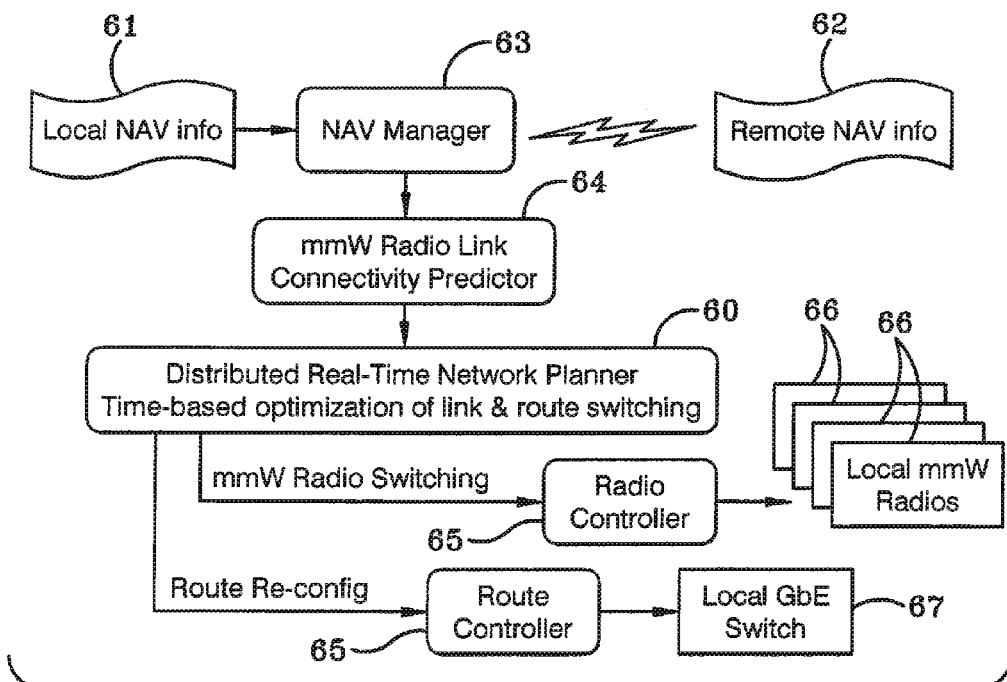
FIG. 13 illustrates some of the components of an example distributed network manager.

The network-wide connectivity between all HSB nodes and the GIG is maintained by a distributed Network Manager residing in each HSB node. An example distributed network manager 60 is illustrated in FIG. 13. As illustrated, local NAV info 61 and remote NAV info 62 are input to a NAV manager 63. The NAV manager 63 conditions this information and forwards it to a connectivity predictor 64 that provides prediction on the movement of nodes to the distributed network manager 60. Outputs from the distributed network manager 60 are input to radio controllers 65 that are used to control the radios 66 and the local GbE switch 67.

Maintaining the HotSpots Backbone Network

The distributed network manager 60 is a distributed software system that uses prediction of location and orientation of HSB nodes to maintain HSB network connectivity. This system is identical in each HSB node and ensures coordinated control of mmW radio links via GPS-synchronized protocol messages exchanged over the HSB network. A distributed implementation can be chosen so that the HSB network is resilient to any combination of node failures or disconnects.

At its core, distributed network manager/planner 60 decides future mmW radio fink setups and teardowns to avoid network disconnects based on predicted possible radio connections. The possibility of a connection between any two mmW radios is determined by the connectivity predictor 64 (FIG. 12) based on expected future relative position and orientation range of the radios' gimbals. The local 61 and remote NAV info 62 (current position, orientation, velocity, and expected flight path) is collected from and exchanged with neighbor HSB nodes by the NAV manager 63 over a link-state-like protocol transmitted over the HSB network. The network planner 60 actuates new radio connections via the radio controller 65.

The network planner 60 also chooses the next set of radio links and routes that maximizes the number of HSB nodes connected to the GIG (in the order of their QoS priority), while minimizing the total path cost. Links have higher (or infinite) costs when distance is larger (or too large). The static case (with no changes in radio connectivity) is solved as a min cost network flow problem with variable source/sink flows that depend on the decisions made in connecting the nodes (UAVs) via radios and with penalty terms to encourage node connectivity to the GIG gateway node.

The Integer Programming formulation of this problem has a number of constraints order of number of HSB node pairs, which for 20 nodes is 190. Open source solvers (LP Solve) or commercial (CPLEX) are known to solve such problems with 100,000 s constrains within one second. The dynamic case includes predicted events that change radio connectivity. FIG. 14 illustrates some variables, parameters, constraints and other data useful when maintaining hotspot backbone networks while FIG. 15 illustrates a timing diagram used to manage links with various radios in different UAVs.

The high speed of HSB network can have significant losses even in millisecond link disruptions. The first layer of reliability is avoiding any link and route disconnects through Predictive Routing described above. The second layer is within the network switch hardware, where high-speed buffers absorb mmW radio disconnects of milliseconds. The third reliability layer is provided by an IP-layer gateway implemented in software running on the SBC of each node (FIG. 16). The Network Planner can predict upcoming link and route disruptions and reconfigure the route of high QoS priority traffic to divert through the local IP-layer gateway. Assuming the high priority traffic is a relatively small fraction of the total traffic, the SBC memory can accumulate traffic for 100 s of ms. For example, 1 GB of memory can buffer 100 Mb/s traffic for 80 s.

Figure 17:
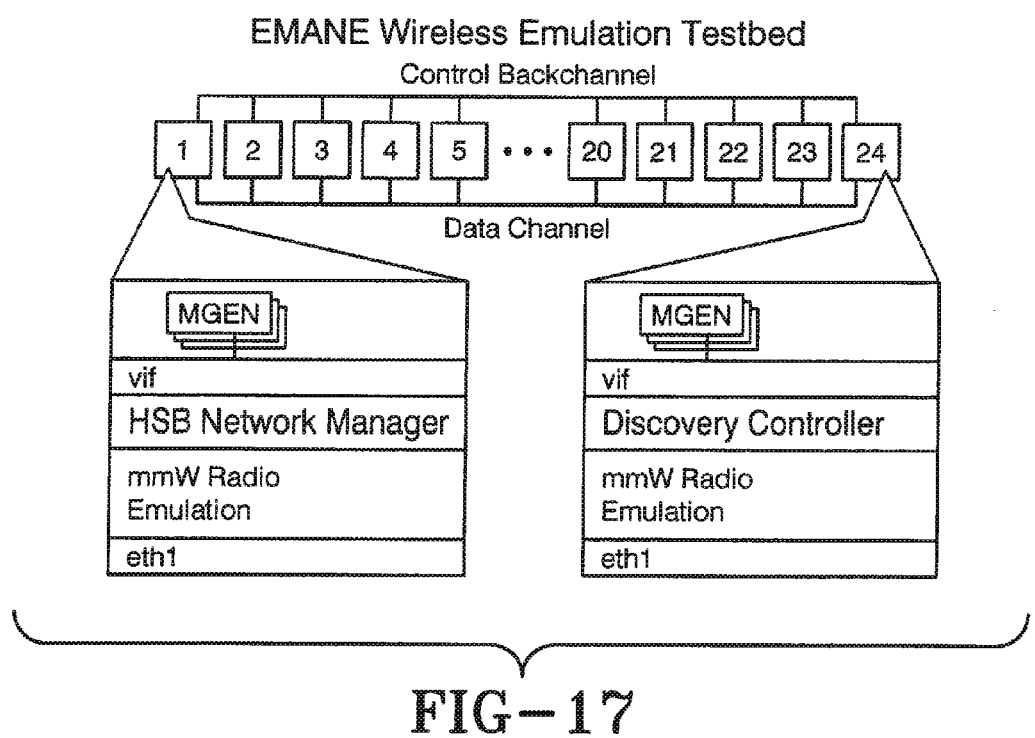
FIG. 17 illustrates an example testbed emulation that was used to verify the maintenance of hotspots.

The Network Manager can provide access to network status and configuration via standard SNMP interfaces. Compatibility with IPv4/v6 is built in the embedded GbE switch, Network Manager and the IP-gateway, and thus provides interoperability with the GIG and HAIPE. FIG. 17 illustrates an example testbed emulation that was used to verify the above description of maintaining hotspots.

HotSpots Node Discovery

The preferred embodiment is an innovative discovery method based on SATCOM rather than traditional LOS radios. The current approach implements a Hot Spot Discovery (HSD) network using Iridium's Short Burst Data (SBD) service. While Iridium is recommended in the preferred embodiment, other systems such as Orbcomm or MUOS or another system could be used. The Iridium based approach allows the discovery radio to be reduced to a mere 3 grams of weight consuming less than 1 Watt average power. It allows not just for LOS discovery, but true global discovery. The penalty for such a low SWAP system is latency. But this is easily accommodated within the Hot Spot system design.

The primary role of discovery is to help "Orphans" find the network, as well as to allow network fragments to find each other and reconnect into a single network. To do this, the system includes the "Network Controller" (NC) discussed earlier that acts as a discovery server. All nodes periodically send SBD to the NC which tracks the location and status of everyone. Orphans are nodes that are not part of the HotSpots Backbone (HSB) network. Typically this is because they have not yet entered the network, or, due to mobility, are no longer able to maintain a link with any other node. Even when completely disconnected, nodes can be made aware of how to find the network via the Iridium based HSD. The NC will periodically inform Orphans of the nearest node with full connectivity. The NC will also inform an Orphan when a link is possible and schedule a rendezvous with a fully connected node. Once connected, the Orphan quickly discovers the full network topology and becomes fully connected over the HSB network.

Another problem which can occur is that a network can become fragmented due to topological issues. A directional network must make allowances for fragmentation to occur and have methods to reconnect itself back into a single network once possible. Because all nodes are always reachable on the HSD network, the NC can monitor the overall network topology and give navigational guidance (if permissible) to specific nodes allowing them to restore the full network. Once the nodes are within range, the NC provides specific guidance to close a link and reconnect the network.

Because the discovery network operates at very low data rates, it can be ultra-low power and is highly scalable. The predictive topology management approach adopted allows for substantial latency in the discovery process. Once fully connected, nodes broadcast data to each other using the HSB network. This allows for low latency connectivity and all further link, route, and topology management occurs using the HSB network.

Hotspot Access Point Radio

The Mobile Hotspots Access Point can use a commercially-available radio system as a surrogate for a military waveform to provide connectivity to squads, platoons and companies. Of the readily available commercial standards (Wi-Fi, WiMAX, and LTE), Wi-Fi offers by far the lowest SWAP-C. For example, Ubiquiti Wi-Fi embedded radios can be sued. These radios offer class-leading receive sensitivities (~90 dBm @ 11 Mbps) and transmit powers (+28 dBm) in the industry standard miniPCI form factor; these radios have been used in record-setting Wi-Fi links (>300 km). Further, in one configuration of the preferred embodiment can use Ubiquiti's XR7, a proprietary 700 MHz radio based on 802.11b/g specifically designed for long-distance, outdoor broadband wireless and public safety applications. Using a 700 MHz radio offers >10 dB lower free-space path loss relative to 2.4 GHz system. This allows links to be closed in excess of the 4 km program requirement without the use of an external power amplifier, greatly reducing the overall SWAP of the solution.

Wi-Fi radios have been successfully demonstrated in air-to-ground applications. For example, 802.11b 11 Mbps links were successfully demonstrated from a C-12C Test Aircraft flying at 150 knots closed air-to-ground at ranges of 6-8 km, representing link margins of 6 dB and 0 db, respectively. Although these experiments used external power amplifiers, the superior receive sensitivity and lower free-space path loss realize >10 dB link margins at 8 km ranges without paying SWAP penalty of external amplifications.

Backbone Network Router Hardware

The backbone network router hardware approach can be a CompactPCI-based approach that offers many advantages. These types of computing and networking devices are commodity components offered by multiple vendors. Therefore, competitive pressures insure that these products will be driven to the highest performance at the lowest SWAP-C. As technology improves, an open standard like cPCI allows system upgrades at minimal expense. All selected 3U (3 rack unit) components are available in ruggedized, conduction-cooled variants. Additionally, there are other emerging, more advanced embedded computing standards (e.g., VPX, CompactPCI Serial) available; CompactPCI may offer a good selection of low-power components against the Mobile Hotspots requirements. In general, all these standard share a 3U Eurocard form factor (3.9"×6.3). Future versions of the router could be upgraded to a high-speed serial switched fabric backplane with minimal mechanical changes One example of the backbone router has five major hardware components. The first component is layer-2/3 managed 10-port gigabit Ethernet switch (including a dedicated PowerPC network processor) to support full wire speed traffic at minimal latency among traffic sources (E-band transceivers, hotspot radio, an additional pod, and ISR sources). The second component is a mini-PCI-based high-performance Wi-Fi hotspot radio. The third component is an Iridium Short Burst Data (SBD) modem as discovery radio. The fourth component can be a low-SWAP MEMS-based GPS-IMU, which shares an L-band antenna with the Iridium SBD modem. The fifth component can be a single-board computer that implements the predictive routing protocol via control of the managed switch, executes the Wi-Fi access point software, interface with GPS-IMU and discovery radio, and host any antenna pointing, acquisition, and tracking algorithms required by TA1. These components can be assembled using non-ruggedized version in a desktop chassis for experimental purposes. The 3U cards are available in conduction-cooled Level 5 ruggedized configurations. In future versions, these components would be integrated in a flight-ready compact chassis such as the GE-IP RT4 (10"×4.8"×5.4", 250 in$^3$), for example.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 18:
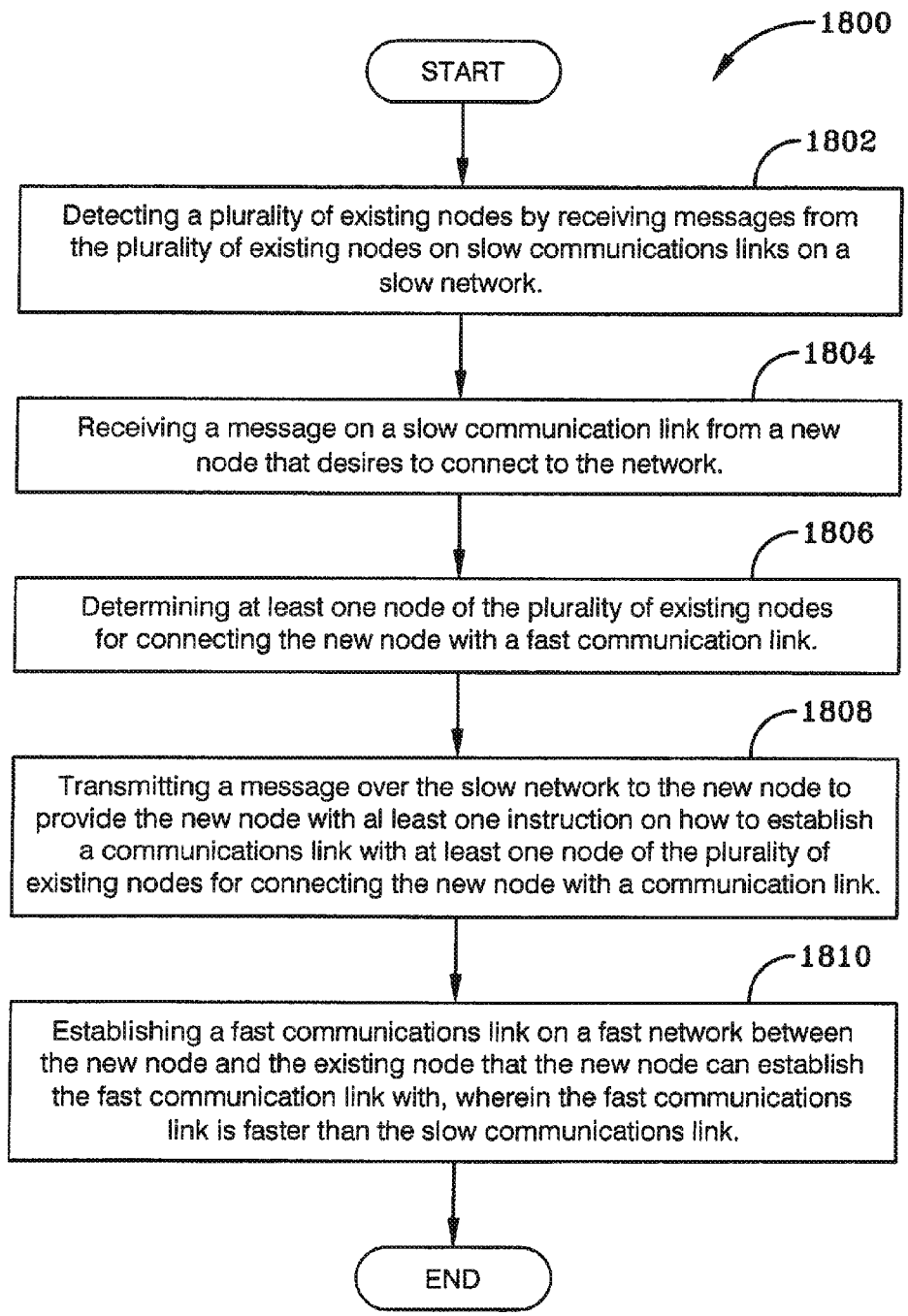
FIG. 18 illustrates an embodiment of a method for adding nodes to a fast network with the assistance of slower network.

FIG. 18 illustrates a method 1800 of a method of assisting a radio in finding a network. The method begins by detecting a plurality of existing nodes by receiving messages from the plurality of existing nodes, at 1802, on slow communications links on a slow network. As mention above, the slow network may be created by the Iridium satellite constellation or in another way. A message is received on a slow communication link from a new node, at 1804. At 1806, a determination is made if there is one or more existing nodes already connected to the fast network to which the new node might be able to establish a connection with to communicate on a fast network. The fast network has a data rate that is faster than the slow network. Based on that determination, a message is transmitted, at 1808, over the slow network to the new node to provide the new node at least one instruction about how to establish a fast communications link, at 1810, with one or more nodes near its location. Using that information, the new node can establish the fast communication link on the fast network with one of the nodes nearest its location. As discussed above, the fast network has a data rate that is faster than the slow network. For example, the fast network can be a wireless network operating in the E-Band between 2 GHz and 3 GHz and the slow network can be a wireless network operating in a frequency band between 1618.85 MHz and 1626.5 MHz.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method of assisting a radio in finding a network comprising:
    establishing a search pattern and a variable search beamwidth based on distance between a plurality of existing nodes, and wherein the search pattern includes one of the plurality of existing nodes staring at one tile in the search pattern for N dwell times, wherein N is the number of tiles in the search pattern and N is greater than 1, and the search pattern includes one of the plurality of existing nodes scanning all tiles in the search pattern consecutively using one dwell time each;
    detecting a plurality of existing nodes at a discovery controller by receiving messages, including location and status information via short burst data (SBD) messages, from the plurality of existing nodes on slow communications links on a slow network;
    receiving a message on a slow communication link of the slow network from a new node;
    determining at least one node of the plurality of existing nodes for connecting to the new node with a fast communication link of a fast network;
    transmitting a message over the slow network to the new node to provide the new node at least one instruction on how to establish a fast communications link with the at least one node of the plurality of existing nodes for connecting the new node to the fast network;
    and based, at least in part, on the message establishing a fast communications link on the fast network between the new node and the existing node that the new node can establish the fast communication link with, wherein the last network has a data rate that is faster than the slow network.

2. The method of assisting a radio in finding a network of claim 1 wherein the plurality of existing nodes are connected to the fast network with directional links and wherein the establishing a fast communications link on the fast network between the new node and the one node of the plurality of existing nodes for connecting the new node further comprises:
    on the fast network, establishing a directional link between the new node and the one node of the plurality of existing nodes for connecting the new node, wherein the directional link is not omnidirectional.

3. The method of assisting a radio in finding a network of claim 1 wherein the establishing a directional link further comprises:

pointing a direction antenna at the new node toward the one node of the plurality of existing nodes for connecting the new node.

4. The method of assisting a radio in finding a network of claim 1 further comprising:
creating a hotspot from a hotspot node in the fast network allowing new nodes that enter the hotspot to establish new fast communication links with the hotspot node.

5. The method of assisting a radio in finding a network of claim 4 wherein the creating a hotspot from a hotspot node further comprises:
creating the hotspot node from an airplane.

6. The method of assisting a radio in finding a network of claim 4 wherein the creating a hotspot from a hotspot node further comprises:
creating the hotspot node from an unmanned aerial vehicle (UAV).

7. The method of assisting a radio in finding a network of claim 1 wherein the establishing a fast communications link further comprises:
establishing the fast communications link on an E-Band between 2 GHz and 3 GHz in the electromagnetic spectrum.

8. The method of assisting a radio in finding a network of claim 1 wherein the transmitting the message over the slow network further comprise:
transmitting the message over the slow network in a frequency band between 1618.85 MHz and 1626.5 MHz.

9. The method of assisting a radio in finding a network of claim 1 wherein the transmitting the message over the slow network further comprises:
transmitting the message to a satellite orbiting the earth.

10. The method of assisting a radio in finding a network of claim 9 wherein the satellite is an Iridium satellite.

11. The method of assisting a radio in finding a network of claim 1 further comprising:
tracking the plurality of existing nodes to determine locations of the plurality of nodes.

12. The method of assisting a radio in finding a network of claim 11 wherein the tracking further comprises:
tracking one of the plurality of nodes that is moving to determine its geographic location and predicting a future geographic location of the one of the plurality of nodes.

13. The method of assisting a radio in finding a network of claim 11 wherein the tracking further comprises:
tracking one of the plurality of nodes that is an unmanned aerial vehicle.

14. The method of assisting a radio in finding a network of claim 1 further comprising:
using prediction algorithms to generate updated position of moving nodes, and wherein the determining at least one node of the plurality of existing nodes for connecting the new node to the fast communication link is based, at least in part on the updated positions.

15. The method of assisting a radio in finding a network of claim 1 further comprising:
pointing a directional antenna at the new node to the existing node that the new node can establish the fast communication link with in a direction based, at least in part, on the at least one instruction.

16. The method of assisting a radio in finding a network of claim 1 further comprising:
periodically communicating to every node on the fast network locations of the plurality of existing nodes and the new node.

17. The method of assisting a radio in finding a network of claim 1, wherein the short burst data (SBD) is sent to and received from the network controller using a discovery controller radio that is less than thirty grams and consumes less than one watt average power.

18. The method of assisting a radio in finding a network of claim 1, wherein prior to the step of establishing a search pattern and a variable search beamwidth comprises the step of:
setting the dwell times in the search pattern to double modem acquisition time to ensure acquisition of asynchronous links.

19. A method for adding a new node to a fast network using directional links comprising:
establishing, at a plurality of existing nodes, a search pattern and a variable search beamwidth controlled by a discovery controller, and wherein the search pattern includes one of the plurality of existing nodes staring at one tile in the search pattern for N dwell times, wherein N is the number of tiles in the search pattern and N is greater than 1, and the search pattern includes one of the plurality of existing nodes scanning all tiles in the search pattern consecutively using one dwell time each,
and the search pattern adapted to locate an unlinked new node approaching the search pattern;
and wherein the new node is detected at the discovery controller by receiving messages, including location and status information via short burst data (SBD) messages, from the plurality of existing nodes on slow communications links on a slow network;
communicating with a new node over the slow network without using a directional link, wherein the data rate of the slow network is less than the data rate of the fast network;
sending a message to the new node over the slow network indicating at least one existing node on the fast network that is near the new node;
in response to the message, pointing a directional antenna associated with the new node toward the at least one existing node that is near the new node;
and establishing a directional fast communications link on the fast network between the new node and the at least one existing node.

20. The method for adding a new node to a fast network using directional links of claim 19 wherein the new node is an unmanned aerial vehicle (UAV), wherein the at least one existing node is a first at least one existing node, the directional fast communications link is a first directional fast communications link and further comprising:
tracking the UAV with respect to the first at least one existing node;
determining when the UAV is moving away from the first at least one existing node;
determining that a second at least one existing node that can provide a second directional fast communications link;
when the UAV has moved a threshold distance away from the first at least one existing node, establishing the second directional fast communications link on the fast network between the new node and the second at least one existing node.

21. The method for adding a new node to a fast network using directional links wherein of claim 19 the plurality of further comprising:
tracking the at least one existing node.

22. The method for adding a new node to a fast network using directional links of claim 19 wherein the slow network is a wireless network and the fast network is a wireless network and further comprising:

operating the fast network in an E-Band between 2 GHz and 3 GHz in the electromagnetic spectrum; and operating the slow band between 1618.85 MHz and 1626.5 MHz v in the electromagnetic spectrum.

\* \* \* \* \*